(12) United States Patent
Elliott

(10) Patent No.: US 7,515,716 B1
(45) Date of Patent: Apr. 7, 2009

(54) SYSTEMS AND METHODS FOR RESERVING CRYPTOGRAPHIC KEY MATERIAL

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 702 days.

(21) Appl. No.: 10/786,314

(22) Filed: Feb. 26, 2004

(51) Int. Cl.
  *H04K 1/00* (2006.01)
  *H04L 9/08* (2006.01)

(52) U.S. Cl. ........................ 380/256; 380/278
(58) Field of Classification Search ............... 380/277
  See application file for complete search history.

(56) References Cited

U.S. PATENT DOCUMENTS

| | | | |
|---|---|---|---|
| 4,445,116 A | 4/1984 | Grow | 340/825.05 |
| 4,649,233 A | 3/1987 | Bass et al. | |
| 4,770,535 A | 9/1988 | Kim et al. | |
| 5,058,973 A | 10/1991 | Refregier et al. | |
| 5,243,649 A | 9/1993 | Franson | |
| 5,307,410 A | 4/1994 | Bennett | |
| 5,311,572 A | 5/1994 | Friedes et al. | |
| 5,325,397 A | 6/1994 | Scholz et al. | |
| 5,339,182 A | 8/1994 | Kimble et al. | |
| 5,400,325 A | 3/1995 | Chatwani et al. | |
| 5,414,771 A | 5/1995 | Fawcett, Jr. | |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | |
| 5,710,773 A | 1/1998 | Shiga | |
| 5,729,608 A | 3/1998 | Janson et al. | |
| 5,732,139 A | 3/1998 | Lo et al. | |
| 5,757,912 A | 5/1998 | Blow | |
| 5,764,765 A | 6/1998 | Phoenix et al. | |
| 5,764,767 A | 6/1998 | Beimel et al. | |
| 5,768,378 A | 6/1998 | Townsend | |
| 5,768,391 A | 6/1998 | Ichikawa | |
| 5,805,801 A | 9/1998 | Holloway et al. | |
| 5,850,441 A | 12/1998 | Townsend et al. | |
| 5,911,018 A | 6/1999 | Bischel et al. | |
| 5,953,421 A | 9/1999 | Townsend | |
| 5,960,131 A | 9/1999 | Fouquet et al. | |
| 5,960,133 A | 9/1999 | Tomlinson | |
| 5,966,224 A | 10/1999 | Hughes et al. | |
| 6,005,993 A | 12/1999 | MacDonald | |

(Continued)

OTHER PUBLICATIONS

N. Gisin et al. Quantum Cryptography on Noisy Channels: Quantum versus Classical Key-Agreement Protocols. Nov. 15, 1999. The American Physical Society. p. 4200-4203.*

(Continued)

*Primary Examiner*—Christian LaForgia
(74) *Attorney, Agent, or Firm*—Ropes & Gray LLP

(57) ABSTRACT

Systems and a methods are provided for reserving a rate at which cryptographic material is provided. A reservation request [700] for reserving the rate is sent from a secret bits consuming application [410] to a secret bit producing application [405]. The secret bits producing application [405] determines whether the reservation request can be satisfied. When the secret bits producing application determines that the reservation can be satisfied, the rate is reserved for the secret bits consuming application [410].

37 Claims, 12 Drawing Sheets

U.S. PATENT DOCUMENTS

| | | | |
|---|---|---|---|
| 6,028,935 | A | 2/2000 | Rarity et al. |
| 6,052,465 | A | 4/2000 | Gotoh et al. |
| 6,097,696 | A | 8/2000 | Doverspike |
| 6,122,252 | A | 9/2000 | Aimoto et al. |
| 6,130,780 | A | 10/2000 | Joannopoulos et al. |
| 6,145,024 | A | 11/2000 | Maezawa et al. |
| 6,154,586 | A | 11/2000 | MacDonald et al. |
| 6,160,651 | A | 12/2000 | Chang et al. |
| 6,188,768 | B1 | 2/2001 | Bethune et al. |
| 6,233,075 | B1 | 5/2001 | Chang et al. |
| 6,233,393 | B1 | 5/2001 | Yanagihara et al. |
| 6,272,548 | B1 | 8/2001 | Cotter et al. |
| 6,289,104 | B1 | 9/2001 | Patterson et al. |
| 6,341,127 | B1 | 1/2002 | Katsube et al. |
| 6,378,072 | B1 | 4/2002 | Collins et al. |
| 6,430,345 | B1 | 8/2002 | Dultz et al. |
| 6,463,060 | B1 | 10/2002 | Sato et al. |
| 6,507,012 | B1 | 1/2003 | Medard et al. |
| 6,519,062 | B1 | 2/2003 | Yoo |
| 6,522,749 | B2 * | 2/2003 | Wang ............. 380/263 |
| 6,529,498 | B1 | 3/2003 | Cheng |
| 6,532,543 | B1 | 3/2003 | Smith et al. |
| 6,538,990 | B1 | 3/2003 | Prorock |
| 6,539,410 | B1 | 3/2003 | Klass |
| 6,560,707 | B2 | 5/2003 | Curtis et al. |
| 6,563,796 | B1 | 5/2003 | Saito |
| 6,594,055 | B2 | 7/2003 | Snawerdt |
| 6,605,822 | B1 | 8/2003 | Blais et al. |
| 6,646,727 | B2 | 11/2003 | Saleh et al. |
| 6,647,010 | B1 | 11/2003 | Ford et al. |
| 6,650,805 | B2 | 11/2003 | Chen et al. |
| 6,654,346 | B1 | 11/2003 | Mahalingaiah et al. |
| 6,661,806 | B1 * | 12/2003 | Eriksson et al. ............. 370/468 |
| 6,678,379 | B1 | 1/2004 | Mayers et al. |
| 6,684,335 | B1 | 1/2004 | Epstein et al. |
| 6,728,281 | B1 | 4/2004 | Santori et al. |
| 6,748,434 | B2 | 6/2004 | Kavanagh |
| 6,754,214 | B1 | 6/2004 | Mahalingaiah |
| 6,778,557 | B1 | 8/2004 | Yuki et al. |
| 6,799,270 | B1 | 9/2004 | Bull et al. |
| 6,801,626 | B1 | 10/2004 | Nambu |
| 6,836,463 | B2 | 12/2004 | Garcia-Luna-Aceves et al. |
| 6,862,564 | B1 | 3/2005 | Shue et al. |
| 6,882,431 | B2 | 4/2005 | Teich et al. |
| 6,895,091 | B1 | 5/2005 | Elliott et al. |
| 6,895,092 | B2 | 5/2005 | Tomita |
| 6,897,434 | B1 | 5/2005 | Kumar et al. |
| 6,986,056 | B1 | 1/2006 | Dultz et al. |
| 7,028,059 | B2 | 4/2006 | Williams et al. |
| 7,035,411 | B2 | 4/2006 | Azuma et al. |
| 7,068,790 | B1 * | 6/2006 | Elliott ............. 380/278 |
| 2001/0038695 | A1 * | 11/2001 | Kim ............. 380/283 |
| 2002/0015573 | A1 | 2/2002 | Ishibashi |
| 2002/0021467 | A1 | 2/2002 | Ofek et al. |
| 2002/0025041 | A1 | 2/2002 | Tomita |
| 2002/0097874 | A1 | 7/2002 | Foden et al. |
| 2002/0110245 | A1 | 8/2002 | Gruia |
| 2002/0141019 | A1 | 10/2002 | Chang et al. |
| 2003/0002074 | A1 | 1/2003 | Nambu et al. |
| 2003/0002670 | A1 * | 1/2003 | Wang ............. 380/52 |
| 2003/0002674 | A1 | 1/2003 | Nambu et al. |
| 2003/0059157 | A1 | 3/2003 | DeCusalis et al. |
| 2003/0137944 | A1 * | 7/2003 | Medvinsky ............. 370/252 |
| 2003/0215088 | A1 * | 11/2003 | Bao ............. 380/28 |
| 2003/0231771 | A1 | 12/2003 | Gisin et al. |
| 2004/0005056 | A1 | 1/2004 | Nishioka et al. |
| 2004/0008843 | A1 | 1/2004 | Van Enk |
| 2004/0019676 | A1 | 1/2004 | Iwatsuki et al. |
| 2004/0109564 | A1 * | 6/2004 | Cerf et al. ............. 380/256 |
| 2004/0136321 | A1 * | 7/2004 | Ren et al. ............. 370/230 |
| 2004/0165884 | A1 | 8/2004 | Al-Chalabi |
| 2004/0190725 | A1 | 9/2004 | Yuan et al. |
| 2005/0036624 | A1 * | 2/2005 | Kent et al. ............. 380/277 |
| 2005/0094818 | A1 * | 5/2005 | Inoue et al. ............. 380/278 |
| 2006/0252381 | A1 * | 11/2006 | Sasaoka et al. ............. 455/78 |

OTHER PUBLICATIONS

Ueli M. Maurer et al. Unconditionally Secure Key Agreement and the Intrinsic Conditional Information. Mar. 1999. IEEE Transactions on Information Theory. vol. 45 No. 2, p. 499-514.*

Shengli Liu et al. "A practical protocol for Advantage Distillation and Information Reconciliation." 2003. Kluwer Academic Publishers. p. 39-62.*

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Butler, W.T., et al. "Free space quantum-key distribution," Physical Review A, 57(4):2379-2382 (Apr. 1998).

Jacobs, B.C., et al., "Quantum cryptography in free space," Optics Letters, 21(22):1854-1856 (Nov. 1996).

Bethune, D.S., et al., An Autocompensating Fiber-Optic Quantum Cryptography System Based on Polarization Splitting of Light, IEEE Journal of Quantum Electronics, 36(3):340-347 (2000).

Imamoglu, A., et al., "Turnstile Device for Heralded Single Photons: Coulomb Blockade of Electron and Hole Tunneling in Quantum Confined p-i-n Heterojunctions," Physical Review Letters, 72(2):210-213 (1994).

Ueli Maurer et al.; "Information-Theoretic Key Agreement: From Weak to Strong Secrecy for Free"; Computer Science Department, Swiss Federal Institute of Technology; 2000; 20 pages.

Ueli M. Maurer; "Secret Key Agreement by Public Discussion from Common Information"; IEEE Transactions on Information Theory; vol. 39, 1993; 19 pages.

Charles H. Bennett et al.; "Generalized Privacy Amplification"; IBM Research; May 31, 1995; 24 pages.

Office action issued on Sep. 6, 2007 for U.S. Appl. No. 10/803,509.
Office action issued on Jul. 10, 2007 for U.S. Appl. No. 10/795,313.
Office action issued on May 25, 2007 for U.S. Appl. No. 10/218,652.
Office action issued on Oct. 23, 2007 for U.S. Appl. No. 10/324,355.
Office action issued on Dec. 27, 2007 for U.S. Appl. No. 10/795,313.
Office action issued on Oct. 11, 2007 for U.S. Appl. No. 10/795,398.
Office action issued on Mar. 27, 2008 for U.S. Appl. No. 10/799,177.

"Quantum key distribution: Real-time compensation of interferometer phase drift," NTNU Department of Physical Electronics, pp. 1-45, date unknown.

"Quantum Public Key Distribution System," IBM Technical Disclosure Bulletin, 28(7):3153-3163 (Dec. 7, 1985).

Awduche, D.O., et al., "Multi-Protocol Lambda Switching: Combining MPLS Traffic Engineering Control With Optical Crossconnects," Internet Draft (Jan. 2001).

Basak, D., et al., "Multi-protocol Lambda Switching: Issues in Combining MPLS Traffic Engineering Control With Optical Cross-connects," Internet draft (Aug. 2000).

Bennett, C.H., et al., "Experimental Quantum Cryptography," Journal of Cryptography's special issue after Eurocrypt '90, 28 pages (Sep. 1991).

Bennett, C.H., et al., "Quantum Cryptography: Public Key Distribution and Coin Tossing," Proceedings of IEEE International Conference on Computers, Systems & Signal Processing, Bangalore, India, pp. 175-179, Dec. 10-12, 1984.

Bethune, D.S., et al., "An Autocompensating Fiber-Optic Quantum Cryptography System Based on Polarization Splitting of Light," IEEE Journal of Quantum Electronics, XX(Y): 100-108 (1999).

Bethune, D.S., et al., "Prototype Autocompensating Quantum Cryptography System Based on Polarization Splitting of Light," Session QC41—Quantum Computing and Cryptograph, Oral session, Wednesday morning, Mar. 24, 1999, Liberty Room, Omni Hotel.

Brassard, G., et al., "Cryptology Column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).
Collins, G.P., "Quantum Cryptography Defies Eavesdropping," Physics Today, pp. 21-23 (Nov. 1992).
Crepeau, C., et al., "Secure Multi-party Quantum Computation," ACM, pp. 1-10 (2001).
Eisenberg, S., "Lucent Technologies names Cherry Murray physical sciences research vice president," Press Release (Mar. 28, 2000).
Ekert, A.K., "Quantum Cryptography Based on Bell's Theorem," Physical Review Letters, 67(6):661-663 (1991).
Elliott, B.B., et al., "Path-length control in a interferometric QKD link," Proc. of SPIE, vol. #5101, 11 pages (Apr. 21, 2003).
Elliott, C., "Building the quantum network," New J. Phys., 4:46 (2002).
Franson, J.D., "Bell Inequality for Position and Time," Physical Review Letters, 62(19):2205-2208 (1989).
Franson, J.D., "Violations of a New Inequality for Classical Fields," John Hopkins University, NTIS-NASA Publication; Goddard Space Flight Center; Workshop in Squeezed States and Uncertainty Relations, Feb. 1991, pp. 23-32.
Gisin, N., et al., "Quantum cryptography and long distance Bell experiments: How to control decoherence," Geneva, Switzerland, pp. 1-7 and 4 pages of drawings (Jan. 15, 1999).
Gisin, N., et al., "Quantum cryptography," Reviews of Modern Physics, 74:145-184 (2002).
Gottesman, D., et al., "Secure quantum key distribution using squeezed states," pp. 1-19 (Sep. 25, 2000).
Jenriewein, T., et al., "Quantum Cryptography with Entangled Photons," Physical Review Letters, 84(20):4729-4732 (2000).
Lin, L.Y., et al., "Free-Space Micromachined Optical Switches for Optical Networking," IEEE Journal of Selected Topics in Quantum Electronics, 5(1):4-9 (1999).
Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui, date unknown.
Naik, D.S., et al., "Entangled State Quantum Cryptography: Eavesdropping on the Ekert Protocol," Physical Review Letters, 84(20):4733-4736 (2000).
Phoenix, S.J.D., et al., "Multi-user quantum cryptography on optical networks," Journal of Modern Optics, 42(6):1155-1163 (1995).
Ribordy, G., et al., "Long-distance entanglement-based quantum key distribution," Physical Review A, vol. 63, 012309-1-012309-12 (2001).
Rosen, E., et al., "Multiprotocol Label Switching Architecture," MPLS Architecture, 1-61 (Jan. 2001).
Scarani, V., et al., "Quantum Cryptography Protocols Robust Against Photon Number Splitting Attacks for Weak Lazer Pulse Implementations," Physical Review Letters, 92(5):057901-1 through 057901-4 (Feb. 2004).
Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.
Schneier, B., "Applied Cryptography," Second Edition, Chapter 10, Oct. 18, 1995, Wiley & Sons Publ., pp. 216-220.

Slutsky, B., et al., "Defense frontier analysis of quantum cryptographic systems," Applied Optics, 37(14):2869-2878 (1998).
Stucki, D., et al., "Quantum Key Distribution over 67 km with a plug&play system," New Journal of Physics, 41.1-41.8 (2002).
Tanzilli, S., et al., "PPLN waveguide for quantum communication," Eur. Phys. J.D., 18:155-160 (2002).
Tittel, W., et al., "Long-distance Bell-type tests using energy-time entangled photons," Physical Review A, 59(6):4150-4163 (1999).
Townsend, P.D., "Secure key distribution system based on quantum cryptography," Electronic Letters, 30(10):809-811 (1994).
Townsend, P.D., et al., "Enhanced Single Photon Fringe Visibility in a 10km-Long Prototype Quantum Cryptography Channel," Electronic Letters, 29(14):1291-1293 (1993).
Townsend, P.D., et al., "Single Photon Interference in 10km Long Optical Fiber Interferometer," Electronic Letters, 29(7):634-635 (1993).
Walker, J.A., "Telecommunications Applications of MEMS," mstnews, pp. 6-9 (Mar. 2000).
Xiao, L., et al., "Efficient Multi-Party Quantum Secret Sharing Schemes," pp. 1-7 (May 28, 2004).
Degermark, M., et al., "Small Forwarding Tables for Fast Routing Lookups," ACM, pp. 3-14 (1997).
Estrin, D., et al., "Security Issues in Policy Routing," IEEE, pp. 183-193 (1989).
Garcia-Luna-Aceves, J. J., et al., "Distributed, Scalable Routing Based on Vectors of Link States," IEEE, pp. 1383-1395 (1995).
Garcia-Luna-Aceves, J. J., et al., "Scalable link-state Internet routing," Network Protocols, pp. 52-61 (Oct. 13-16, 1998).
Huang, N., "A Novel IP-Routing Lookup Scheme and Hardware Architecture for Multigigabit Switching Routers," IEEE Journal on Selected Areas in Communication, 17(6):1093-1104 (1999).
Lakshman, T. V., et al., "High-Speed Policy-based Packet Forwarding Using Efficient Multi-dimensional Range Matching," ACM, pp. 203-214 (1998).
Lampson, B., et al., "IP Lookups Using Multiway and Multicolumn Search," IEEE/ACM Transactions on Networking, 7(3):324-334 (1999).
Ramanathan, R., et al., "Hierarchically-organized, multihop mobile wireless networks for quality-of-service support," Mobile Networks and Applications, 3:101-119 (1998).
Tsai, W. T., et al., "An Adaptive Hierarchical Routing Protocol," IEEE Transactions on Computers, 38(8):1059-1075 (1989).
Waldvogel, M., et al., "Scalable High Speed IP Routing Lookups," ACM, pp. 25-36 (1997).
Bowers, J.E., "Optical Network and Component Trends," UCSB, NSF Workshop, 51 pages, date unknown.
Honjo, T., et al., "Differential-phase-shift Quantum Key Distribution," NTT Technical Review, 2(12):26-33 (Dec. 2004).
Nambu, Y., et al., "BB84 Quantum Key Distribution System based on Silica-Based Planar Lightwave Circuits," Fundamental and Environmental Research Laboratories and Fiber Optic Devices Division, pp. 1-11, date unknown.
Paniccia, M., "Silicon Integrated Photonics," UCSB, 30 pages, Feb. 2, 2005.
Tomita, A., et al., "Recent Progress in Quantum Key Transmission," NEC J. of Adv. Tech., 2(1):84-91 (Winter 2005).

\* cited by examiner

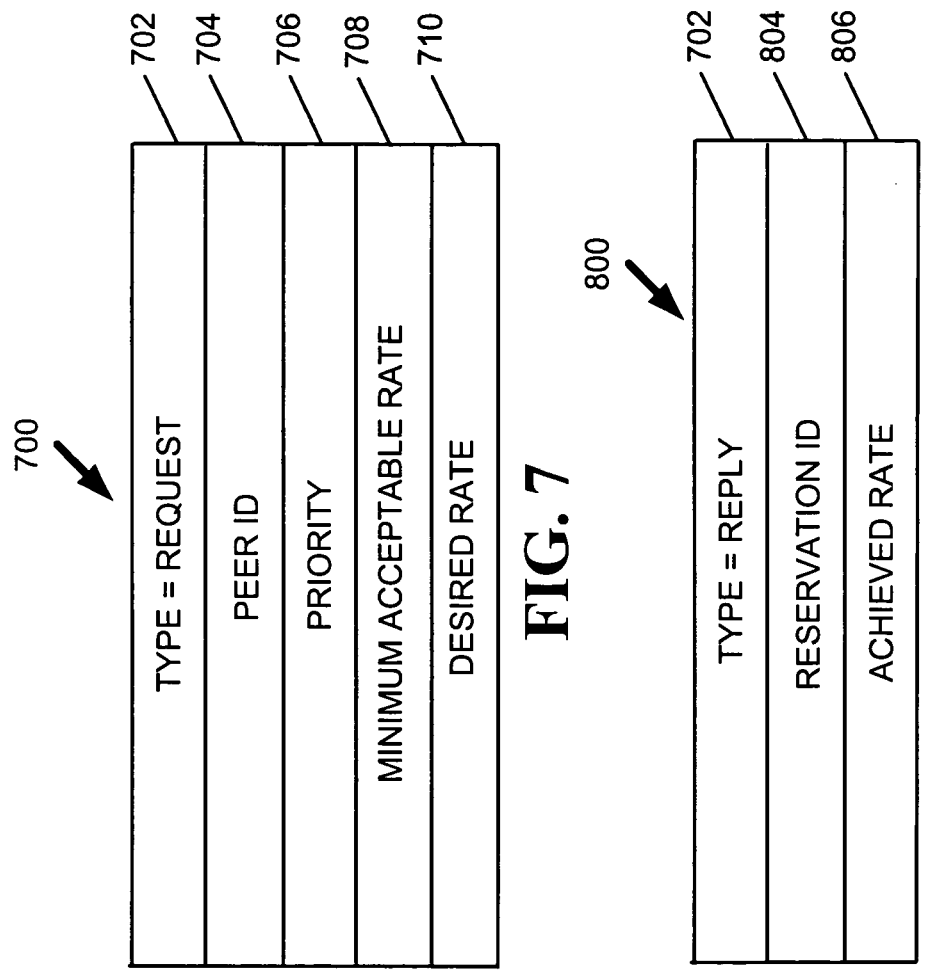

SYSTEMS AND METHODS FOR RESERVING CRYPTOGRAPHIC KEY MATERIAL

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Projects Agency (DARPA).

TECHNICAL FIELD

The invention relates generally to the field of cryptographic systems, and more particularly to systems and methods for reserving a rate at which secret bits are provided for one or more applications that consume the secret bits.

BACKGROUND OF THE INVENTION

Advantage distillation is a well-known approach to a cryptographic key agreement protocol. An example of a system that exploits advantage distillation is a quantum cryptographic system, although other exemplary systems, such as those based on receiving random or pseudo-random sequences of 0s and 1s from satellite or terrestrial transmissions, including radio frequency (RF) transmissions, have also been proposed.

A system that exploits advantage distillation may include a source of bits (S) and two legitimate receivers (A, B). If an eavesdropper (E) does not have perfect reception of the random bits (S), then A and B can agree on random numbers derived from the S bits in such a way that E essentially has no knowledge of the random numbers, even if E has a much better receiver than A or B.

In order to perform advantage distillation, A and B communicate via a public communications channel regarding the bits they received well. The well-received bits are used to create a shorter random number. The greater the ratio of the original length of the random sequence to this shorter random number, the greater the assurance that E will have little or no knowledge of the shorter random number.

Such a system may use a flow of secret bits that may be used as cryptographic key material to which the system adds and consumes over time. Such systems provide the key material on a first-come, first-served basis. It would be advantageous for a process that requires a flow of secret bits to be able to reserve a particular rate of secret bits in order to guarantee the availability of the secret bits to the process when needed. Current systems that exploit advantage distillation do not provide such a feature.

SUMMARY OF THE INVENTION

Systems and methods are provided for reserving a rate at which secret bits are provided for applications that consume the secret bits. Such applications may include cryptographic applications, such as those that are based on advantage distillation (for example, an application that employs quantum cryptography). Typically, such applications may include a secret bits producing application for producing the secret bits and may include an application, such as a client application, that consumes the secret bits produced by the secret bits producing application.

In a first aspect of the invention, a method is provided for reserving a rate at which cryptographic material is provided. A first reservation request for reserving a first rate is sent from a first secret bits consuming application to a secret bits producing application. The secret bits producing application determines whether the reservation request can be satisfied. When the secret bits producing application determines that the reservation request can be satisfied, the first rate is reserved for the first secret bits consuming application.

In a second aspect of the invention, a system is provided. The system includes a secret bits consuming application and a secret bits producing application. The secret bits producing application is configured to receive a request from the secret bits consuming application for a reservation of a rate of secret bits to be produced by the secret bits producing application. The secret bits producing application is further configured to determine whether the reservation can be satisfied and to send a notification to the secret bits consuming application when the reservation request can be satisfied.

In a third aspect of the invention, a machine-readable medium having instructions recorded thereon is provided. When the instructions are read and executed by at least one processor, the at least one processor performs servicing a reservation request for reserving a rate at which secret bits are provided for a secret bits consuming application, determining whether the reservation request can be successfully serviced, and reserving the rate for the bits consuming application when the reservation request can be successfully serviced.

In a fourth aspect of the invention, a system is provided. The system includes means for producing secret bits for use in a cryptographic system and means for using the secret bits to cryptographically protect traffic to be sent through a network. The means for producing the secret bits includes means for receiving a reservation request from the means for using the secret bits and means for reserving the bit rate at which the secret bits are provided and notifying the means for using of a successful reservation.

In a fifth aspect of the invention, a method of reserving a rate of providing cryptographic key material is provided. A desired consumption rate of cryptographic key material is specified at a first network device. The desired consumption rate of cryptographic material is reserved.

In a sixth aspect of the invention, a method of reserving a rate of providing secret bits from a secret bits producer based on advantage distillation is provided. A first process specifies a desired rate. A secret bit producer based on advantage distillation reserves the desired rate.

In a seventh aspect of the invention, a method of reserving a rate of generated cryptographic key material from an advantage-distillation based secret bits producer is provided. The advantage-distillation based secret bits producer generates cryptographic key material. A request from a secure communication process for a reservation of the cryptographic key material at a first rate is received. The secure communication process is notified of a successful reservation when an available generated rate of cryptographic key material is greater than or equal to a specified minimum acceptable rate.

In an eighth aspect of the invention, a method of reserving a rate of providing secret key material for protecting communications is provided. A client process specifies a minimum desired consumption rate of secret key material and a priority. A secret key material producing process determines whether the minimum desired consumption rate of secret key material is available to the client process. When the minimum desired consumption rate of secret key material is not available to the client process, the minimum desired consumption rate of secret key material is made available by canceling at least one previously made reservation of a consumption rate of the secret key material. Each of the at least one previously made reservation has a lower priority than the priority specified by the client process. At least the minimum desired consumption rate of the secret key material is reserved for the client process.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 7 illustrates an exemplary REQUEST message that may be used in implementations consistent with the principles of the invention;

FIG. 8 illustrates an exemplary REPLY message that may be used in implementations consistent with the principles of the invention;

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Exemplary Network

Figure 1:
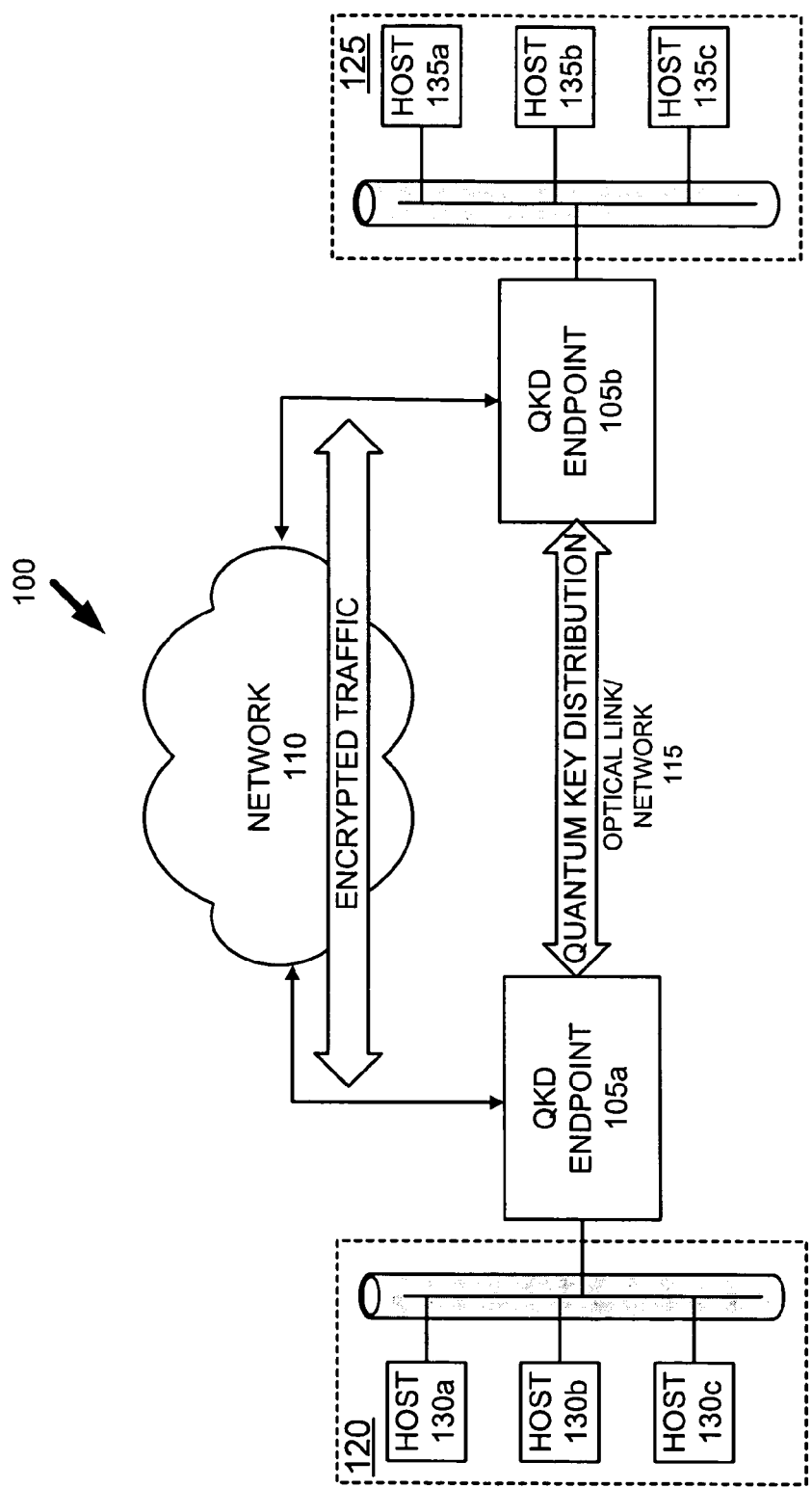
FIG. 1 illustrates an exemplary network consistent with principles of the invention.

FIG. 1 illustrates an exemplary network 100 in which systems and methods consistent with principles of the invention may be implemented. Network 100 may include QKD (Quantum Cryptographic Key Distribution) endpoints 105a and 105b connected via a network 110 and an optical link/network 115. QKD endpoints 105a and 105b may each include a host or a server (e.g., a Virtual Private Network (VPN) gateway). QKD endpoints 105a and 105b may further connect to local area networks (LANs) 120 or 125. LANs 120 and 125 may further connect hosts 130a-130c and 135a-135c, respectively.

Network 110 can include one or more networks of any type, including a Public Land Mobile Network (PLMN), Public Switched Telephone Network (PSTN), LAN, metropolitan area network (MAN), wide area network (WAN), Internet, or Intranet, a VPN, an ATM network, a network employing MultiProtocol Label Switching (MPLS), an Ethernet network, and a Synchronous Optical Network (SONET). Network 110 may also include a dedicated fiber link or a dedicated freespace optical or radio link. The one or more PLMNs may further include packet-switched sub-networks, such as, for example, General Packet Radio Service (GPRS), Cellular Digital Packet Data (CDPD), and Mobile IP sub-networks.

Optical link/network 115 may include a link that carries light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, a path through the atmosphere or outer space, or even through water or other transparent media. As another alternative, the link may include a hollow optical fiber that may be lined with photonic band-gap material.

QKD endpoints 105 may distribute cryptographic key symbols via optical link/network 115. Subsequent to quantum key distribution via optical link/network 115, QKD endpoint 105a and QKD endpoint 105b may cryptographically protect traffic using the distributed key(s) and transmit the traffic via network 110. Though only two QKD endpoints 105 are shown, multiple QKD endpoints 105 (i.e., more than two) may be present in network 100.

It will be appreciated that the number of components illustrated in FIG. 1 are provided for explanatory purposes only. A typical network may include more or fewer components than are illustrated in FIG. 1.

Exemplary QKD Endpoint

Figure 2:
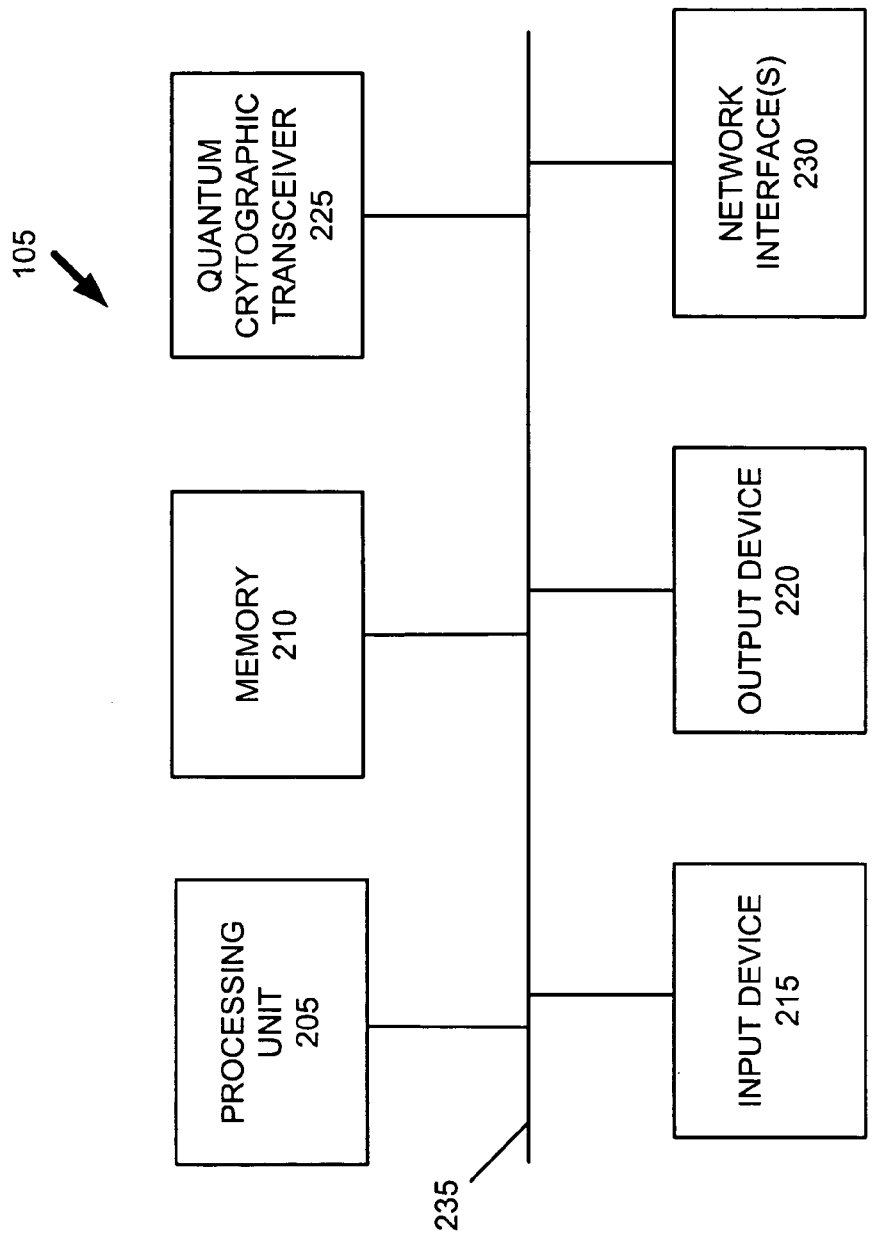
FIG. 2 is a functional block diagram of an exemplary QKD endpoint that may be included in the exemplary network of FIG. 1.

FIG. 2 illustrates exemplary components of a QKD endpoint 105 consistent with the present invention. QKD endpoint 105 may include a processing unit 205, a memory 210, an input device 215, an output device 220, a quantum cryptographic transceiver 225, a network interface(s) 230 and a bus 235. Processing unit 205 may perform all data processing functions for inputting, outputting, and processing of QKD endpoint data. Memory 210 may include Random Access Memory (RAM) that provides temporary working storage of data and instructions for use by processing unit 205 in performing processing functions. Memory 210 may additionally include Read Only Memory (ROM) that provides permanent or semi-permanent storage of data and instructions for use by processing unit 205. Memory 210 can also include non-volatile memory, such as an electrically erasable programmable read only memory (EPROM) that stores data for use by processing unit 205. Memory 210 can further include a large-capacity storage device(s), such as a magnetic and/or optical recording medium and its corresponding drive.

Input device 215 permits entry of data into QKD endpoint 105 and may include a user interface (not shown). Output device 220 permits the output of data in video, audio, or hard copy format. Quantum cryptographic transceiver 225 may include mechanisms for transmitting and receiving cryptographic keys using quantum cryptographic techniques. Network interface(s) 230 may interconnect QKD endpoint 105 with network 110. Bus 235 interconnects the various components of QKD endpoint 105 to permit the components to communicate with one another.

Exemplary Quantum Cryptographic Transceiver

Figure 3:
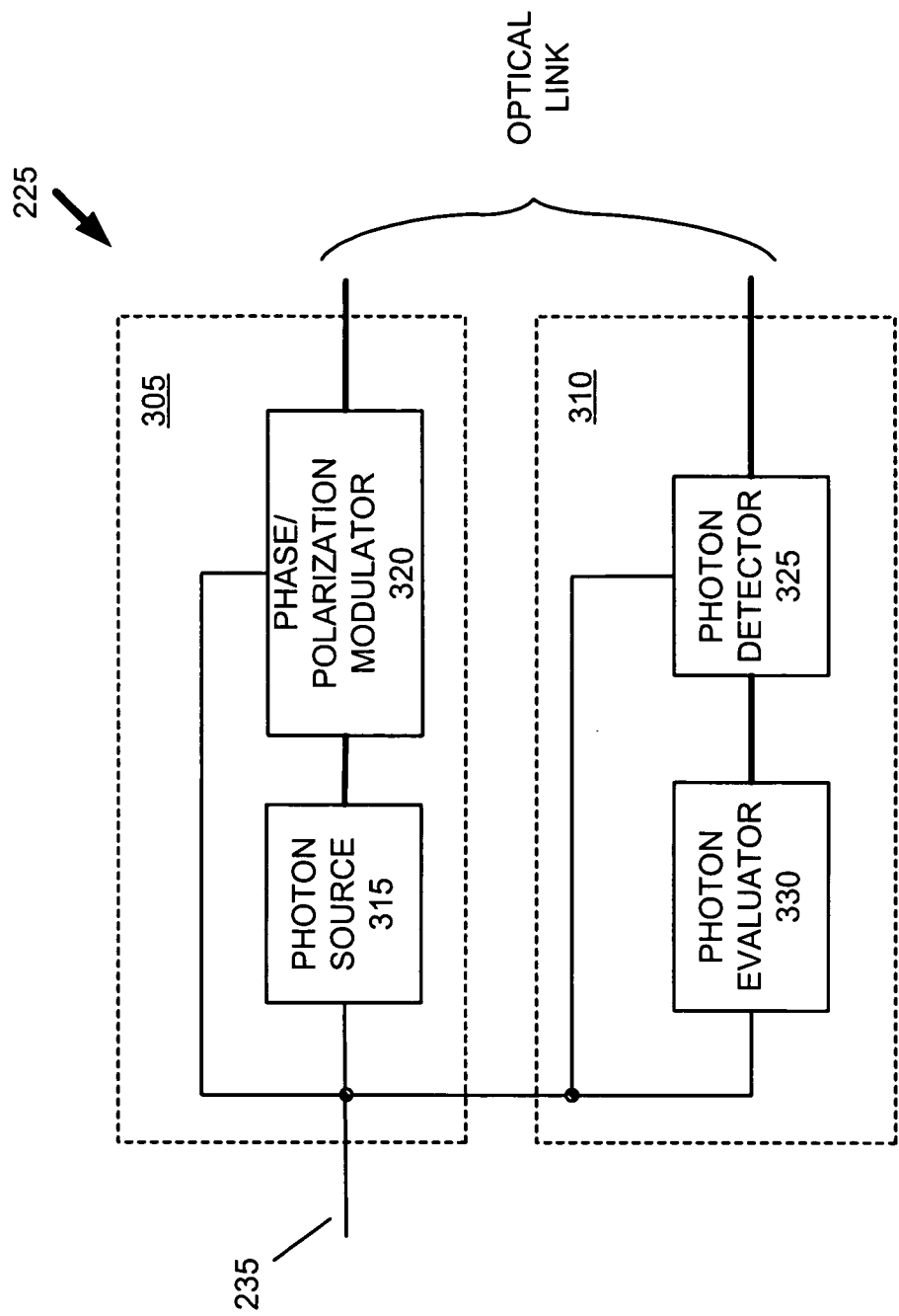
FIG. 3 is a functional block diagram that illustrates an exemplary configuration of the quantum cryptographic transceiver of FIG. 2 consistent with the principles of the invention.

FIG. 3 illustrates exemplary components of quantum cryptographic transceiver 225 of a QKD endpoint 105 consistent with the present invention. Quantum cryptographic transceiver 225 may include a QKD transmitter 305 and a QKD receiver 310. QKD transmitter 305 may include a photon source 315 and a phase/polarization/ modulator 320. Photon source 315 can include, for example, a conventional laser. Photon source 315 may produce photons according to instructions provided by processing unit 205. Photon source 315 may produce photons of light with wavelengths throughout the electromagnetic spectrum, including light in the human visible spectrum and light beyond the human-visible spectrum, such as, for example, infrared or ultraviolet light. Phase/polarization/ modulator 320 can include, for example, conventional Mach-Zehnder interferometers. Phase/polarization/ modulator 320 may encode outgoing photons from the photon source according to commands received from processing unit 205 for transmission across an optical link, such as link 115.

QKD receiver 310 may include a photon detector 325 and a photon evaluator 330. Photon detector 325 can include, for example, conventional avalanche photo detectors (APDs) or conventional photo-multiplier tubes (PMTs). Photon detector 325 can also include cryogenically cooled detectors that sense energy via changes in detector temperature or electrical resistivity as photons strike the detector apparatus. Photon detector 325 can detect photons received across the optical link. Photon evaluator 330 can include conventional circuitry for processing and evaluating output signals from photon detector 325 in accordance with quantum cryptographic techniques.

It will be appreciated that many other forms of quantum cryptographic transceivers may be employed in place quantum cryptographic transceiver 225. For instance, a transceiver may include only photon source 315, or only photon detector 325 and photon evaluator 330. As another example, so-called "plug and play" systems may be employed in which one transceiver includes photon source 315, photon detector 325, and photon evaluator 330, and another transceiver includes phase/polarization modulator 320 and a Faraday mirror (not shown). Alternatively, a transceiver may be based on so-called "entanglement-based" quantum cryptography, in which sets of entangled photons are used instead of single photons.

Exemplary QKD Endpoint Functional Block Diagram

Figure 4:
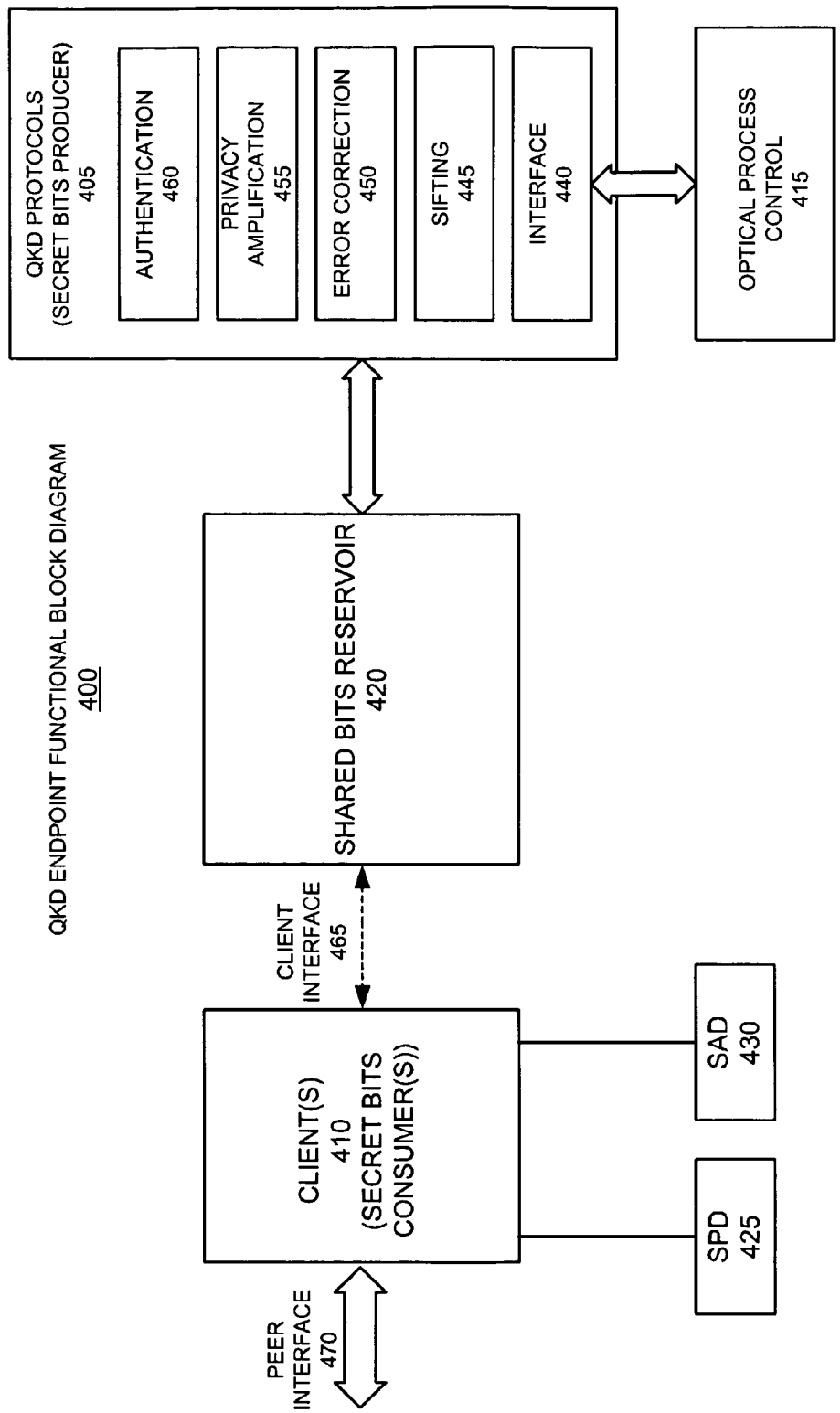
FIG. 4 illustrates an exemplary functional block diagram of the QKD endpoint of FIG. 2.

FIG. 4 illustrates an exemplary functional block diagram 400 of a QKD endpoint 105 consistent with the present invention. Functional block diagram 400 may include QKD protocols 405, client(s) 410, optical process control 415, shared bits reservoir 420, a security policy database (SPD) 425, and a security association database (SAD) 430. QKD protocols 405 (collectively called secret bits producer) may further include an interface layer 440, a sifting layer 445, an error correction layer 450, a privacy amplification layer 455 and an authentication layer 460. The interface layer 440 may include protocols for deriving QKD symbols from photons transmitted via QKD link/network 115 and received at a quantum cryptographic transceiver 225 of a QKD endpoint 105. Values of the QKD symbols (e.g., high or low symbol values) may be interpreted at layer 440 by the polarization, phase or energy states of incoming photons. Interface layer 440 may measure the polarization, phase or energy state of each received photon and interpret the measurement as corresponding to whether a first detector fired, a second detector fired, both first and second detectors fired, neither detectors fired, or any other relevant measurements such as the number of photons detected.

Sifting layer 445 may implement protocols for discarding or "sifting" certain of the raw symbols produced by layer 440. The protocols of sifting layer 445 may exchange basis information between the parties to a QKD symbol exchange. As an example, when QKD endpoint 105a receives polarized photons from QKD endpoint 105b, sifting layer 445 may measure the polarization of each photon along either a rectilinear or diagonal basis with equal probability. Sifting layer 445 may record the basis that is used for measuring the polarization of each photon. Sifting layer 445 may inform QKD endpoint 105b of the basis chosen for measuring the polarization of each photon. QKD endpoint 105b may then, via the protocols of sifting layer 445, inform QKD endpoint 105a, whether it has made the polarization measurement along the correct basis. QKD endpoint 105a and 105b may then "sift" or discard all polarization measurements in which QKD endpoint 105a has made the measurement along the wrong basis and keep only the measurements in which QKD endpoint 105a has made the measurement along the correct basis. For example, if QKD endpoint 105b transmits a photon with a symbol encoded as a 0° polarization and if QKD endpoint 105a measures the received photon via a diagonal basis (45°-135°), then QKD endpoint 105b and 105a will discard this symbol value since QKD endpoint 105a has made the measurement along the incorrect basis.

Error correction layer 450 may implement protocols for correcting errors that may be induced in transmitted photons due to, for example, the intrinsic noise of the quantum channel. Layer 450 may implement parity or cascade checking, convolutional encoding or other known error correction processes. Error correction layer 450 may additionally implement protocols for determining whether eavesdropping has occurred on the quantum channel. Errors in the states (e.g., polarization, phase or energy) of received photons may occur if an eavesdropper is eavesdropping on the quantum channel. To determine whether eavesdropping has occurred during transmission of a sequence of photons, QKD endpoint 105a and QKD endpoint 105b may randomly choose a subset of photons from the sequence of photons that have been transmitted and measured on the same basis. For each of the photons of the chosen subset, QKD endpoint 105b publicly announces its measurement result to QKD endpoint 105a. QKD endpoint 105a then informs QKD endpoint 105b whether its result is the same as what was originally sent. QKD endpoint 105a and 105b both may then compute the error rate of the subset of photons. If the computed error rate is higher than an agreed upon tolerable error rate (typically about 15%), then QKD endpoint 105a and 105b may infer that substantial eavesdropping has occurred. They may then discard the current polarization data and start over with a new sequence of photons.

Privacy amplification layer 455 may implement protocols for reducing error-corrected symbols received from layer 450 to a small set of derived symbols (e.g., bits) to reduce an eavesdropper's knowledge of the key. (In some technical literature, this specific step is known as "advantage distillation," although the term "advantage distillation" is more widely used in the broader sense defined in this application.) If, subsequent to sifting and error correction, QKD endpoint 105a and 105b have adopted n symbols as secret symbols, then privacy amplification layer 455 may compress the n symbols using, for example, a hash function. QKD endpoint 105a and 105b may agree upon a publicly chosen hash function f and take K=f(n symbols) as the shared r-symbol length key K. The hash function randomly redistributes the n symbols such that a small change in symbols produces a large change in the hash value. Thus, even if an eavesdropper determines a number of symbols of the transmitted key through eavesdropping, and also knows the hash function f they still will be left with very little knowledge regarding the content of the hashed r-symbol key K.

Authentication layer 460 may implement protocols for authenticating transmissions between QKD endpoint 105a and 105b via network 110. Such protocols may include any conventional authentication mechanisms known to one skilled in the art (e.g., message authentication codes (MACs)).

Client(s) 410 may include one or more clients that perform various QKD endpoint functions. In one implementation, client(s) 410 may include one or more Internet Key Exchange (IKE) clients that implement key exchange protocols and algorithms. In another implementation, client(s) 410 may include one or more pseudo-random number generators that use deterministic functions that accept secret random numbers as seed values to produce pseudo-random number sequences. Client(s) 410 may retrieve, via client interface 465, secret bit symbols from shared bits reservoir 420 and provide the retrieved symbols, via peer interface 470, to a client associated with another QKD endpoint. Client interface 465 may be internal to a QKD endpoint 105 (e.g., shared via shared memory or local network link). Peer interface 470 may include an external communications channel through network 110.

Optical process control 415 may control opto-electronics of quantum cryptographic transceiver 225. In exemplary embodiments that use framing, optical process control 415 may impose the framing on the QKD link. Optical process control 415 may continuously transmit and receive frames of QKD symbols and report the results to QKD protocol suite 405. Shared bits reservoir 420 may reside in memory 210 and may store the secret cryptographic key symbols (i.e., "bits") derived via QKD protocols 405 (secret bits producer). Shared bits reservoir 420 may, in some implementations, comprise multiple shared bits reservoirs, one for each quantum cryptographic peer.

SPD 425 may include a database, together with algorithms, that classify received data units to determine which data belong in which security associations. This may be accomplished by matching various fields in the received data units with rule sets in the database. SAD 430 may include a database, together with algorithms, that perform Internet Protocol Security (IPsec) algorithms on data units as needed for a given security association (e.g., encryption, decryption, authentication, encapsulation).

Exemplary High-Level System Diagram

Figure 5:
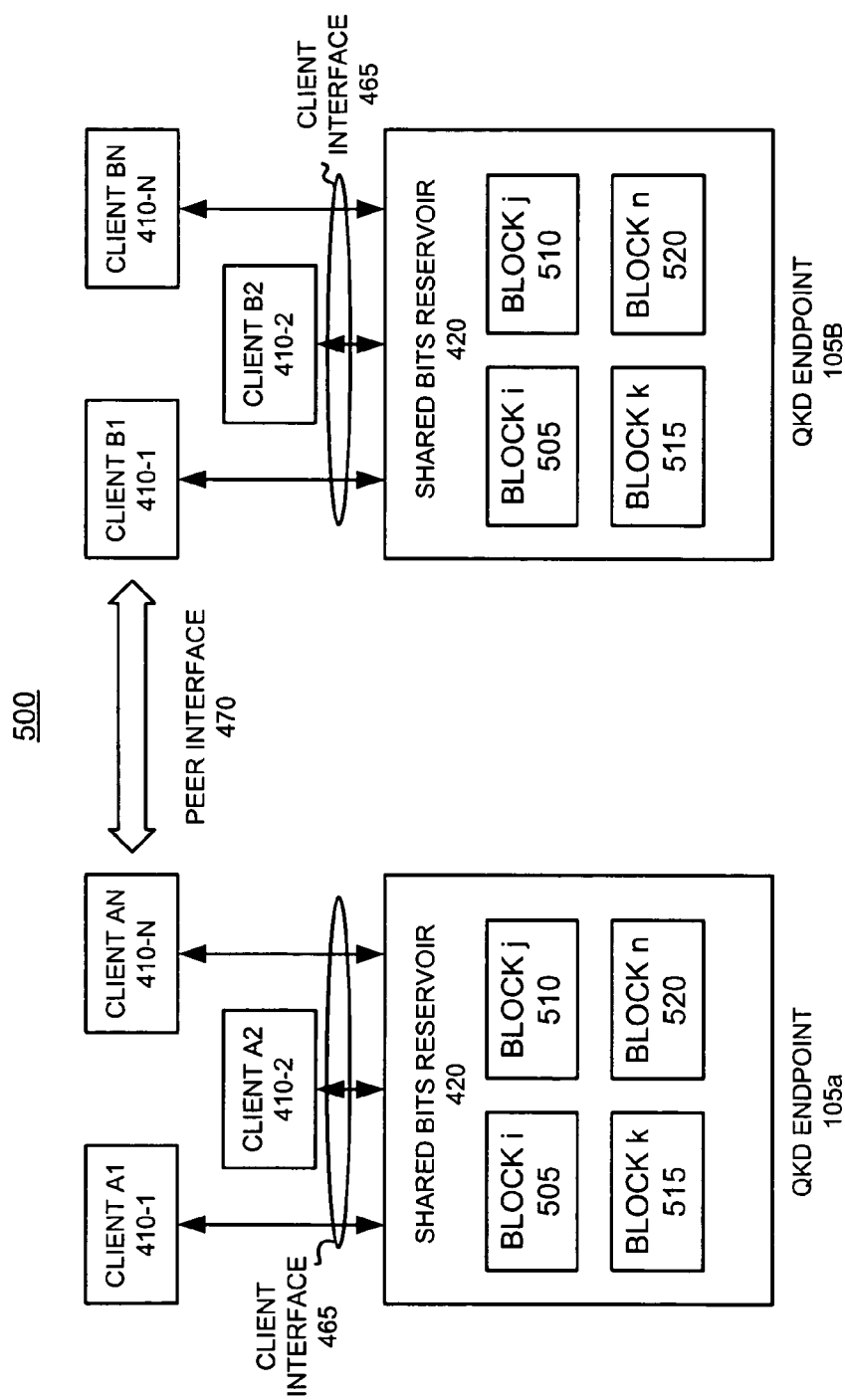
FIG. 5 is a high-level system diagram of an implementation consistent with the principles of the invention.

FIG. 5 is an exemplary high-level system diagram, consistent with the present invention, that illustrates client selection and retrieval of secret bit values from shared bits reservoir 420 at each QKD endpoint 105a and 105b that is party to an cryptographic key exchange via QKD. Each QKD endpoint 105 may include one or more clients 410-1 through 410-N coupled to a shared bits reservoir 420 via a client interface 465. Any of clients 410-1 through 410-N may reserve a flow of secret bit values from the shared bits reservoir 420. Shared bits reservoir 420 may include multiple blocks of the secret bit values stored in one or more memory devices, such as memory 210 (FIG. 2). Each block may contain a series of secret bit values. The block of the multiple blocks may be organized into fixed-size or variable-size blocks. Blocks i 505,j 510, k 515 and n 520 are shown by way of example, though more or fewer numbers of blocks may be present in shared bits reservoir 420. An identification of a selected block of secret bits at one QKD endpoint 105a may be sent, via peer interface 470, to another QKD endpoint 105b. The selected block of secret bits may, for example, then be used for cryptographically protecting traffic sent via network 110 between QKD endpoint 105a and QKD endpoint 105b.

Reservations

Figure 6:
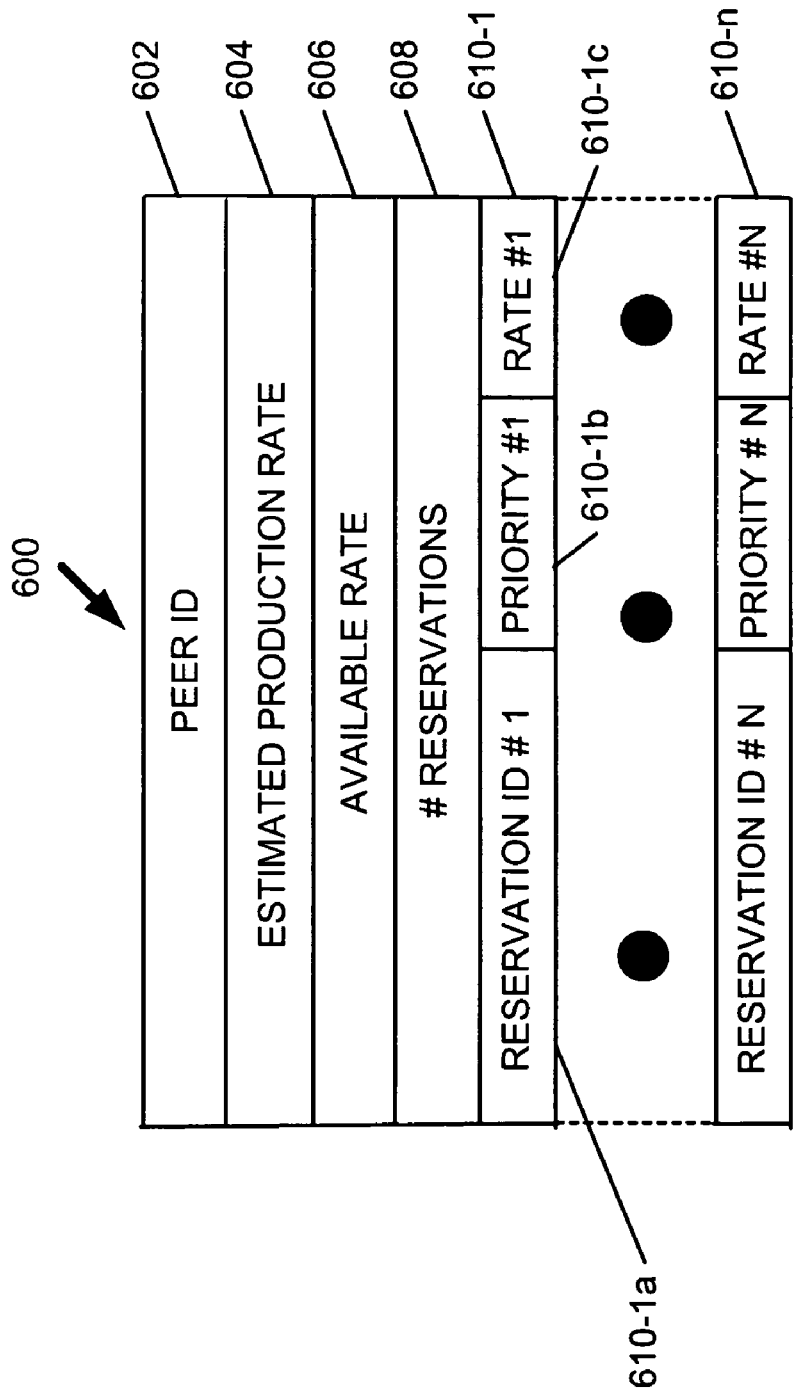
FIG. 6 illustrates an exemplary format of a reservation table that may be used in implementations consistent with the principles of the invention.

FIG. 6 illustrates an exemplary reservation table 400, associated with a peer, such as one of clients 410-1 through 410-N, that may be maintained in each QKD endpoint 105 by a secret bits producer, such as QKD Protocols 405. A number of such reservation tables 600 may be maintained in each QKD endpoint 105, where each reservation table 600 is associated with a different client peer 410 (FIG. 4). Exemplary reservation table 600 may include a peer ID 602, an estimated production rate 604, an available rate 606, a number of reservations 608, and reservation information 610-1 through 610-n for a number of reservations (n) indicated by # reservations 608. Each item of reservation information 610-1 through 610-n may include a reservation ID 610-a, a priority 610-b and a rate 610-c, which may be in bits per second or any other convenient unit of measurement.

Peer ID 602 may refer to associated client peer 410, for example, from a perspective of QKD endpoint 105a, client B1, B2 or BN of QKD 105b (FIG. 5). Estimated production rate 604 may store a value representing an estimate of how fast secret bits are being accumulated with client peer 410. Available rate 606 may store a value representing the estimated production rate minus the sum of the rates for all current reservations in this table associated with a particular peer ID 602. The # reservations field 608 may store a value indicating the number of reservations that are currently active in the table for a particular client peer. In this example, # reservations 408 indicates that n reservations are currently active for a client peer indicated by peer ID 602.

Exemplary REQUEST Message

A REQUEST message may be sent from a client to a secret bits producer, for example, QKD protocols 405, when a reservation is desired. FIG. 7 illustrates an exemplary format of a REQUEST message 700 in an implementation consistent with the present invention. REQUEST message 700 may include a type field 702, a peer ID field 704, a priority field 706, a minimum acceptable rate field 708, and a desired rate field 710.

Type field 702 identifies a message type. For example, type field 702 may identify the message as a REQUEST message. Peer ID field 704 may store an identifier for a peer. In one implementation, the identifier may be a network address. Priority field 706 may store an indication of a priority of the reservation. In one implementation, for example, a low priority may be 1, a medium priority may be 2, and a high priority may be 3. Other priority schemes may be used in other implementations. Minimum acceptable rate field 708 may indicate a lowest acceptable rate for a reservation such as, for example, 100 bits per second. Desired rate field 710 may indicate a desired requested rate such as, for example, 500 bits per second.

Exemplary REPLY Message

FIG. 8 illustrates an exemplary format of a REPLY message 800 that may be sent by the secret bits producer to the client to indicate a success, partial success, or failure of a reservation request. REPLY message 800 may include a type field 702, a reservation ID field 804 and an achieved rate field 806.

Type field 702 may indicate a message type. In this situation, REPLY message 800 may store an identifier that indicates that the message 800 is a REPLY message. Reservation ID field 804 may include a reservation identifier created by a secret bits producer, such as QKD protocols 405, for this particular reservation. Achieved rate field 806 may be zero or a number from a minimum acceptable rate to a desired rate. A value of zero may be a failure indication and a value greater than or equal to the minimum acceptable rate, but less than the desired rate may indicate a partial-success. A value equal to the desired rate may indicate a full-success.

A secret bits producer, for example, QKD protocols 405, may inspect a received REQUEST message and determine if the requested rate is available by inspecting reservation table 600 for the appropriate peer. If the reservation can be fully or partially satisfied, the secret bits producer may add new reservation information 610 to reservation table 600 and may return an appropriate indication, either full-success or partial-success to the requesting client. Otherwise, the secret bits producer may return a failure indication in REPLY message 800 to the requesting client.

Exemplary DONE Message

A client may send a DONE message to a secret bits producer, such as QKD protocols 405, when the reservation is no longer needed. The secret bits producer may then remove the reservation from the appropriate reservation table.

Figure 9:
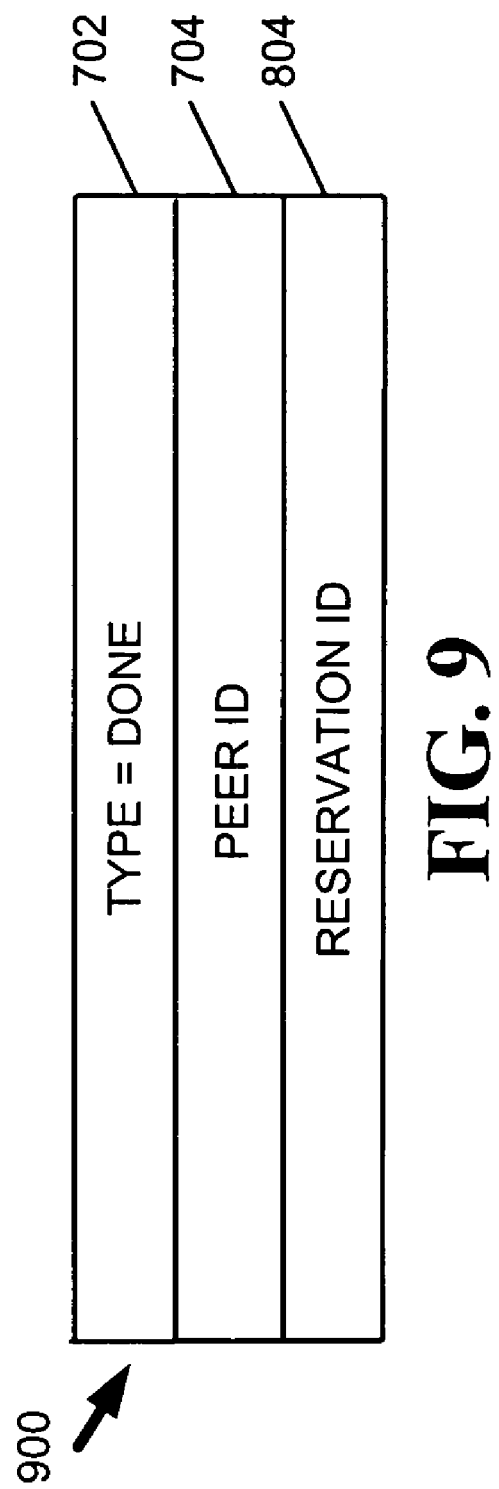
FIG. 9 illustrates an exemplary DONE message that may be used in implementations consistent with the principles of the invention.

FIG. 9 illustrates an exemplary format of a DONE message 900. DONE message 900 may include a type field 702, a peer ID field 704 and reservation ID field 804.

Type field 702 may indicate a message type. In this situation, the DONE message 900 may store an identifier that indicates that the message 900 is a DONE message. Peer ID field 704 may identify a peer, for example, client B1 (FIG. 5). Reservation ID field 804 may include a reservation identifier created by a secret bits producer, such as QKD protocols 405, for this particular reservation.

Other messages may also be used in various implementations. For example, an error message may be issued by a secret bits producer, such as QKD protocols 405, if a DONE message contains an invalid reservation ID. An invalid reservation ID is a reservation ID that cannot be found in reservation table 600 for a particular peer. A variant of the REPLY message may be used as a format for the error message. Instead of having an achieved rate field, the error message may have an error code field. Further, a CHANGE-RESERVATION message may be used in some implementations. Such a message may be sent by a client to a secret bits producer, such as QKD protocols 405, to alter priority and/or a rate for a given reservation. The format of the CHANGE-RESERVATION message may be a variant of the REQUEST message.

Estimated Production Rate

A conservative estimated production rate of a number of bits per second that may be produced by a secret bits producer may be used with implementations consistent with the principles of the invention. Such a conservative estimated production rate may tend to underestimate the actual production rate. Thus, on average, all bits that are actually produced during most periods of operation are not reserved. At least some of the left-over bits may be used on demand in a first-come, first-served manner. If the left-over bits are not used, they may be stockpiled for use during "lean periods" of bit production.

In one implementation consistent with the principles of the invention, estimated production rate may be a $10^{th}$ percentile of observed production rates over a previous K observation intervals, for example, K may be 120 and each observation interval may be 1 minute. In this implementation, the secret bits producer, for example, QKD protocols 405, may measure the actual bit production rate over each production interval (1 minute). The secret bits producer may keep a record of the most recent K (120) observations. If the secret bits producer uses the $10^{th}$ percentile of observed production rate as the estimated production rate, the $12^{th}$ from the lowest measured production rate over the past two hours is selected as the estimated production rate (assuming 120 observations (1 minute each)). Because the observed rate may be in units of bits per minute, the selected value may then be normalized to bits per second by dividing by 60. The resulting value may then be used as estimated production rate 604.

In other implementations, the secret bits producer may use another percentile of observed production rates, K may be a value other than 120, and the observation interval may be an interval other than 1 minute. It should also be noted that many different estimation algorithms may be used in various implementations consistent with the principles of the invention.

Exemplary Estimated Production Rate Update Process

Figure 10:
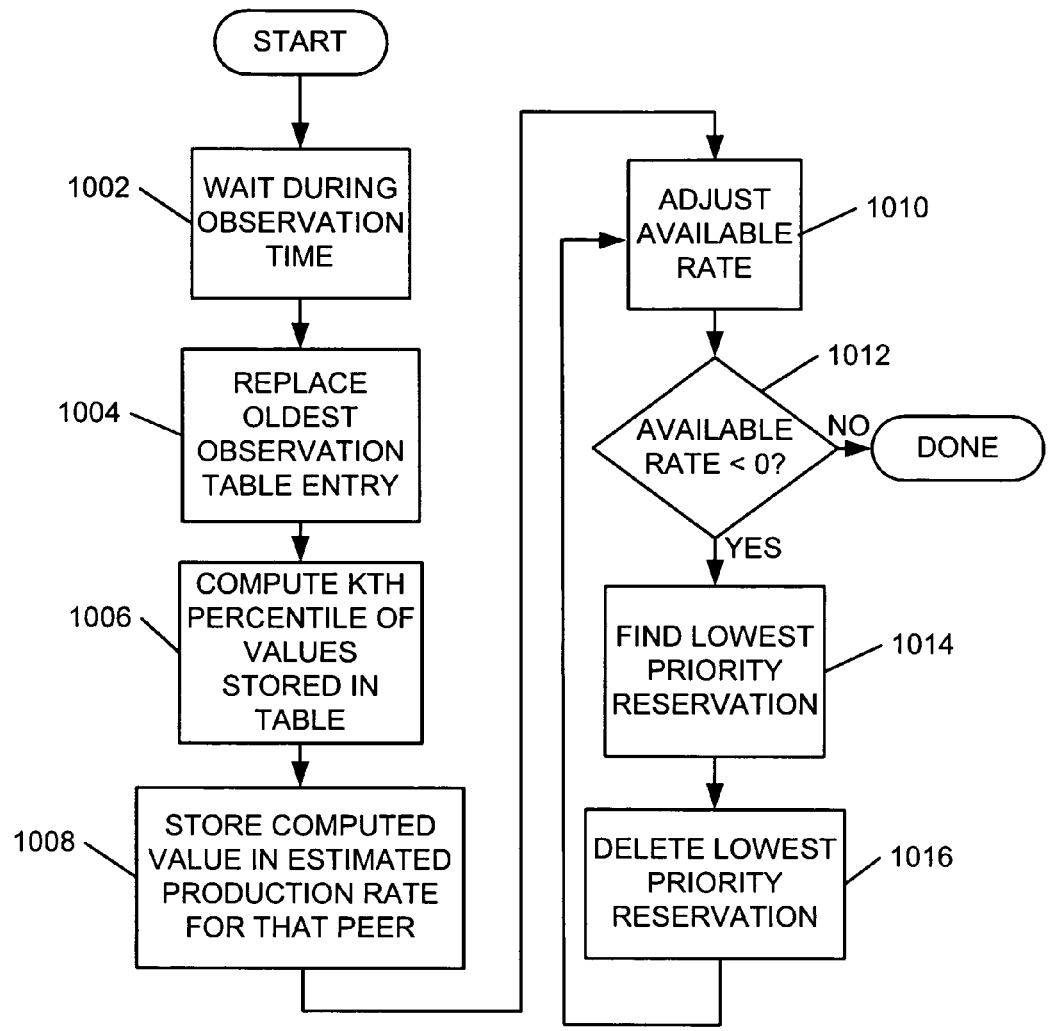
FIG. 10 is a flowchart of an exemplary process for estimating a production rate and an available rate that may be used in implementations consistent with the principles of the invention.

FIG. 10 is a flowchart that illustrates an exemplary process performed by a secret bits producer, such as QKD protocols 405, to update an estimated production rate. The secret bits producer may wait during an observation time interval for a given peer (act 1002). QKD protocols 405 may maintain an observation table including a number of entries X, for example, X may be 120. Each entry may include a number of bits produced during a respective observation interval. After waiting during the observation interval, an oldest observation table entry may be replaced with a number of bits produced during a most recent observation interval (act 1004). The secret bits producer may then compute a $K^{th}$ percentile of values stored in the observation table (act 1006). The secret bits producer may store the computed value in estimated production rate 604 for the peer (act 1008). The secret bits producer may adjust available rate 606 upward or downward, accordingly, based on the estimated production rate 604 (act 1010). The secret bits producer may then determine whether the available rate is less than zero (act 1012). If the available rate is not less than zero, then the procedure is completed. Otherwise, the secret bits producer may find the lowest priority reservation for the given peer by examining priority 610-1b through 610-nb in the reservation table 600 associated with a particular peer (act 1014) and deleting the associated reservation information 610 (act 1016). The secret bits producer may again adjust the available rate (act 1010). The secret bits producer may repeat acts 1014, 1016 and 1010 until the available rate is not less than zero (act 1012). Thus, the secret bits producer may delete lowest priority reservations when the available rate is negative until the available rate becomes non-negative.

Exemplary Reservation Handling Process

Figure 11:
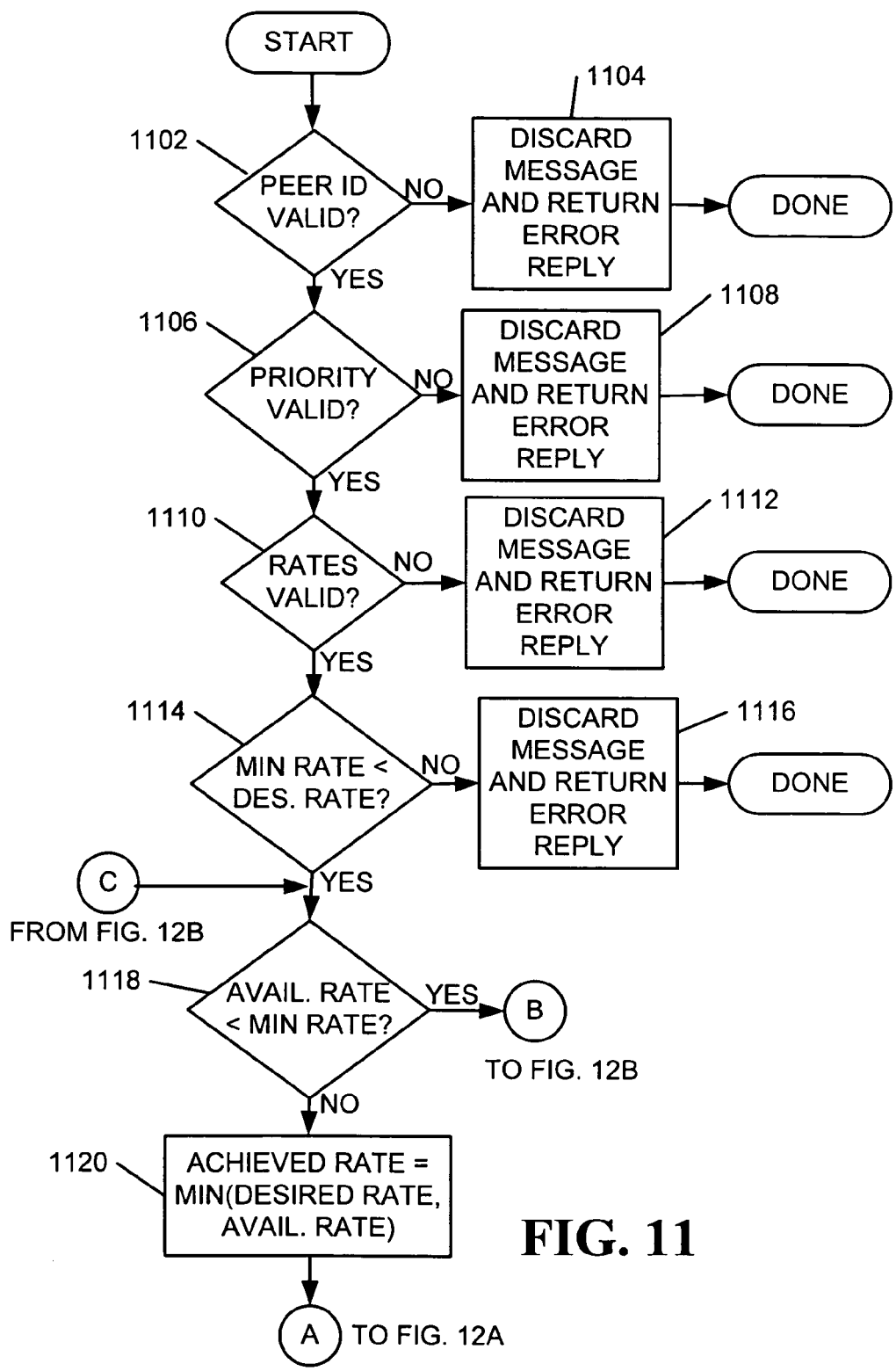
FIGS. 11, 12A and 12B are flowcharts of an exemplary process for processing a REQUEST message in implementations consistent with the principles of the invention.
Figure 12A:
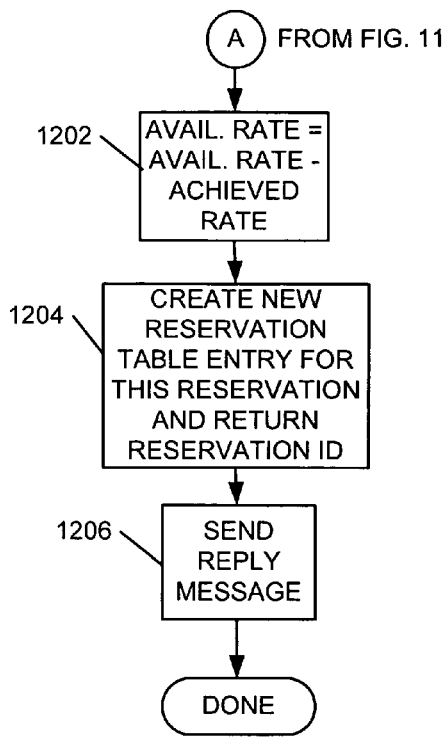
Figure 12B:
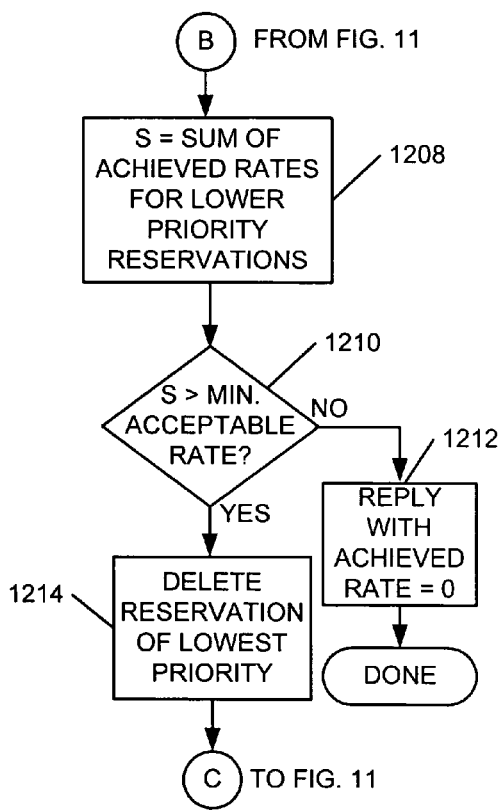

FIGS. 11, 12A and 12B are flowcharts that illustrate exemplary processing in a secret bits producer, such as QKD protocols 405, when a REQUEST message is received. First, the secret bits producer may determine whether peer ID in peer ID field 704 is valid (act 1102). The secret bits producer may determine the validity of a peer ID by examining peer ED field 602 in each reservation table 600 associated with a peer. If a matching peer ID cannot be found, then the value in peer ID field 704 is not valid. If the value in peer ID field 704 is not valid, the secret bits producer may discard the REQUEST message and return an error reply to the client (act 1104).

If the peer ID in peer ID field 704 is valid, the secret bits producer may then check whether a value in priority field 706 of the REQUEST message is valid (act 1106). There may be a range of priority values that may be valid, for example, 1-3. If a priority value is outside the valid range, it is not valid. If the value in priority field 706 is not valid, the secret bits producer may discard the REQUEST message and send an error reply to the client (act 1108).

If the value in priority field 706 is valid, the secret bits producer may then check whether a value in minimum acceptable rate field 708 and desired rate field 710 of the REQUEST message are valid (act 1110). Minimum acceptable rate field 708 and desired rate field 710 may each have a valid range of values, for example, 10-100 and 300-1200, respectively. If either a value in minimum acceptable rate field 708 or a value in desired rate field 710 is not valid, then the secret bits producer may discard the REQUEST message and send an error reply to the client (act 1112).

If the value in minimum acceptable rate field 708 and desired rate field 710 are valid, then the secret bits producer may determine whether the value in minimum acceptable rate field 708 is less than or equal to the value in desired rate field 710 (act 1114). If the value in minimum acceptable rate field 708 is not less than or equal to the value in desired rate field 710, then the secret bits producer may discard the REQUEST message and send an error reply to the client (act 1116).

If the value in minimum acceptable rate field 708 is less than or equal to the value in desired rate field 710 (act 1114), the secret bits producer may then determine whether available rate 606 (FIG. 6) for the appropriate peer is less than the value in minimum acceptable rate field 708 (act 1118). If the value of available rate 606 for the appropriate peer is not less than the value in minimum acceptable rate 708 then the secret bits producer may set a value of achieved rate field 806 of a REPLY message to the lesser of a value in desired rate field 710 and a value in available rate field 606 for the appropriate peer (act 1120).

The secret bits producer may then adjust the value in available rate 606 for the appropriate peer by subtracting the value in achieved rate field 806 from the value in available rate 606 (act 1202; FIG. 12A). The secret bits producer may then create a new reservation information entry 610 for the reservation and may return a value in reservation ID field 804 in the REPLY message to the client (acts 1204 and 1206).

If the secret bits producer determines that the value in available rate 606 for the appropriate peer is less than the value in minimum acceptable rate field 708 (act 1118), the secret bits producer may compute S, the sum of achieved rates for lower priority reservations for the appropriate peer (act 1208; FIG. 12B). The secret bits producer may compute S by examining priority fields 610-1c through 610-nc in reservation table 600 for the appropriate peer. If a value in a respective priority field 610-b is less than the value in priority field 706, the secret bits producer may add a corresponding rate 610-c to S. The secret bits producer may then determine whether S is greater than or equal to the value in minimum acceptable rate field 708. If S is not greater than or equal to the value in minimum acceptable rate 708, the secret bits producer may send a REPLY message to the client with a value of zero in achieved rate field 806, indicating failure (act 1212). Otherwise, the secret bits producer may delete a reservation having lowest priority (act 1214) by finding a priority field 610-b with a lowest priority value in reservation table 600 for the appropriate peer and changing the value of fields 610 to indicate that the fields are deleted. The secret bits producer may then add the old value of rate field 610-c, corresponding to the lowest priority reservation for the peer, to available rate field 606. The secret bits producer may then either repeat acts 1118-1214 if the value in available rate field 606 is less the value in minimum acceptable rate field 708, or the secret bits producer may perform acts 1120, and 1202-1206 if the value in available rate field 606 is not less than the value in minimum acceptable rate field 708.

Exemplary Reservation Deletion Process

Figure 13:
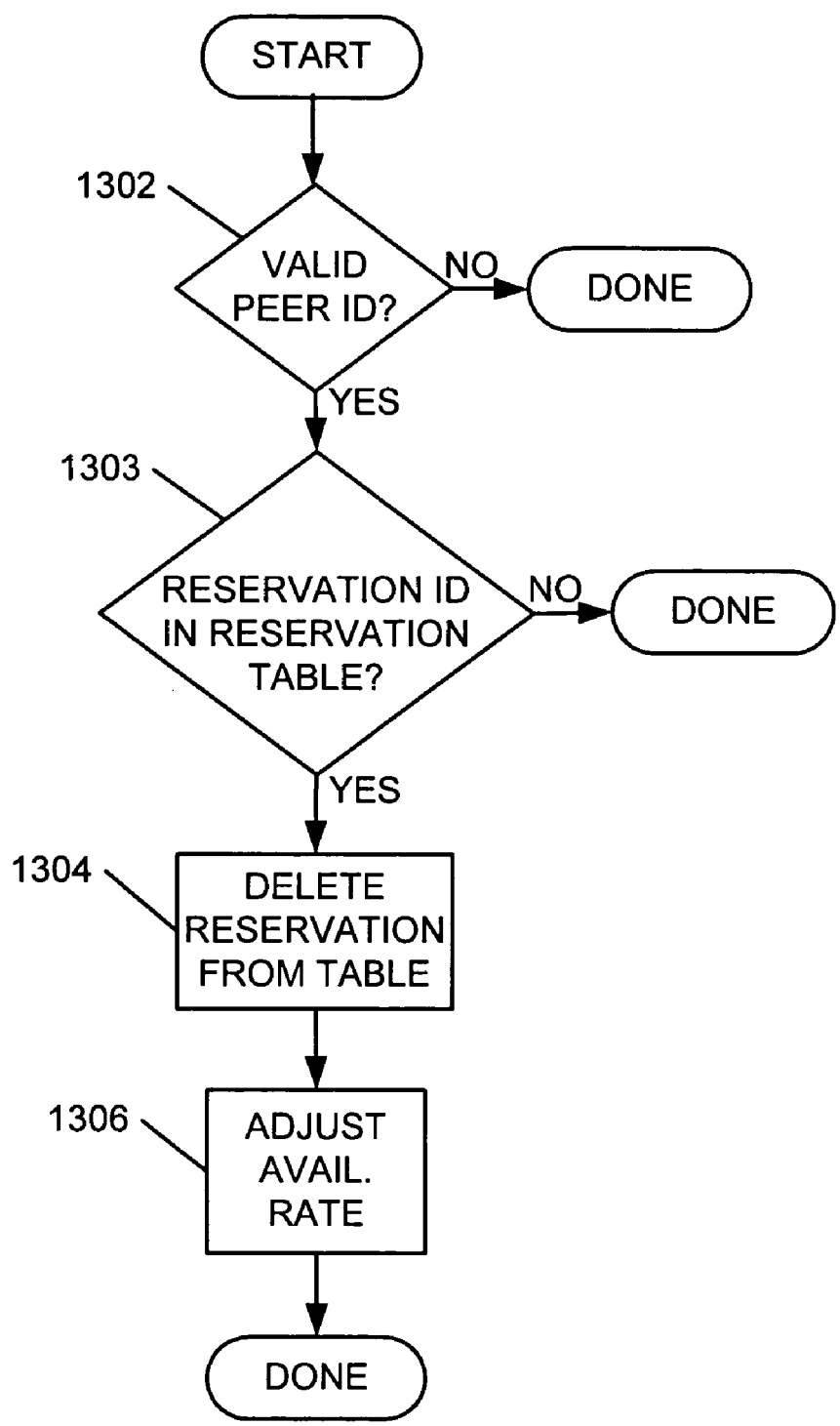
FIG. 13 is a flowchart of an exemplary process for processing a DONE message in implementations consistent with the principles of the invention.

FIG. 13 illustrates a flowchart of a procedure that may be performed by a secret bits producer, such as QKD protocols 405, when a DONE message is received from a client. The exemplary process begins with the secret bits producer determining whether a value in peer ID field 704 (FIG. 9) is valid (act 1302). The value in peer ID field 704 is valid if the value can be found in Peer ID field 602 of one of the reservation tables 600. Otherwise, the value in peer ID field 704 is not valid. If the value in peer ID field 704 is not valid, the procedure may end. Alternatively, the secret bits producer may return an error reply to the client.

If the value in peer ID field 704 is valid, the secret bits producer may determine whether a value in reservation ID field 804 (FIG. 9) is valid (act 1303). The value in reservation ID field 804 is valid if the value can be found in field 610-a of an active reservation information entry for an appropriate peer. Otherwise the value in reservation ID field 804 is not valid. If the value in reservation ID field 804 is not valid, the procedure may end. Alternatively, the secret bits producer may return an error reply to the client.

If the value in reservation ID field 804 is valid, then the secret bits producer may delete the appropriate reservation from reservation table 600 for the peer (act 1304) by changing the active entry 610 having a matching reservation ID 610-1 to indicate a deleted entry. The secret bits producer and may adjust available rate 604 by adding a value in rate field 610-c of the deleted reservation entry to available rate 604 (act 1306).

Hard State vs. Soft State

Networking experts may consider the above-described approach a so-called "hard state" approach to reservations because once a client has made a reservation, the secret bits producer, for example, QKD protocols 405, may correctly maintain the reservation for an unbounded period of time.

Networking experts may consider the following alternative reservation approach to be a so-called "soft state" approach because a reservation lasts for a limited period of time unless it is periodically renewed by the client. Thus, when a client desires to maintain a particular reservation, the client would repeat sending a REQUEST message from time to time. If the reservation is not renewed, it is deleted from the reservation table 400 after the limited amount of time.

Modifications and Variations

In some implementations, a secret bits producer, for example, QKD protocols 405, may determine whether a client is using more bits than it has reserved. If this is the case, the secret bits producer may take some action. For example, the secret bits producer may not provide secret bits to the client beyond the reserved rate or the secret bits producer may provide the bits, but may also send an error reply including a warning to the client informing the client that it is exceeding the reserved rate.

In other implementations, a secret bits producer, for example, QKD protocols 405, may monitor a rate at which bits are consumed. If the bits are being consumed by an "unreserved" client, the bits will be provided to the "unreserved" client if they are available. The bits will not be provided to the "unreserved" clients if they are needed to satisfy a reservation. Thus, bits may be reserved for some services, and other services may receive bits on a best effort basis from bits that remain after all reservations have been satisfied.

Embodiments of the invention may be implemented in hardware, software, or firmware. The firmware may be in a Read-Only Memory (ROM) and the software may reside on, for example, a medium such as a floppy disk, optical disk, or CD ROM.

Other Considerations

The above-described methods and systems may be applied to any system that is based on advantage distillation. Further, although implementations have been described using a secret bits producer, such as QKD protocols 405, implementations consistent with the principles of the invention may be used with any system based on an application that produces bits for other applications or clients that consume bits.

Further, clients 410-1 through 410-N may include software entities that communicate with QKD protocols 405 via an Inter-Process Communication (IPC) technique. The IPC may be the well-known Common Object Request Broker Architecture (CORBA), although many other IPC techniques may be used instead such as, for example, remote procedure calls, well-known Internet protocols, such as Transmission Control Protocol/Internet Protocol (TCP/IP) and User Datagram Protocol/Internet Protocol (UDP/IP), and communications through shared memory.

CONCLUSION

Methods and systems consistent with the principles of the invention allow a secret bits consuming application to reserve bits from a secret bits producing application. The methods and systems may be used with any applications that produce bits and with any applications that consume bits.

The foregoing description of preferred embodiments of the invention provides illustration and description, but is not intended to be exhaustive or to limit the invention to the precise form disclosed. Modifications and variations are possible in light of the above teachings or may be acquired from practice of the invention for example, while a series of acts has been described with regard to FIGS. 10-13, the order of the acts may differ in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of reserving a rate at which cryptographic key material is provided, the method comprising:
   sending a first reservation request for reserving a first rate from a first secret bits consuming application to a secret bits producing application;
   determining, by the secret bits producing application, whether the reservation request can be satisfied;
   reserving the first rate for the first secret bits consuming application when the determining determines that the reservation can be satisfied; and
   outputting an indication that the first rate has been reserved.

2. The method of claim 1, wherein the secret bits are cryptographic key material.

3. The method of claim 2, wherein the secret bits producing application is included in a system receiving random or pseudo-random sequences from an external source.

4. The method of claim 3, wherein the external source is a satellite.

5. The method of claim 3, wherein the random or the pseudo-random sequences are transmitted via radio-frequency signals.

6. The method of claim 2, further comprising using the cryptographic key material to protect traffic flows through an Ethernet network.

7. The method of claim 2, further comprising using the cryptographic key material to protect traffic flows through an internet.

8. The method of claim 2, further comprising using the cryptographic key material to protect traffic flows through an Asynchronous Transfer Mode network.

9. The method of claim 2, further comprising using the cryptographic key material to protect traffic flows through a Synchronous Optical Network.

10. The method of claim 2, further comprising using the cryptographic key material to protect traffic flows through a network employing MultiProtocol Label Switching.

11. The method of claim 2, further comprising using the cryptographic key material to provide secure communications.

12. The method of claim 2, wherein the first secret bits producing application is based on advantage distillation.

13. The method of claim 2, wherein the secret bits producing application is included in a quantum cryptographic system.

14. The method of claim 13, wherein the quantum cryptographic system employs a laser.

15. The method of claim 13, wherein the quantum cryptographic system employs a photon source.

16. The method of claim 13, wherein the quantum cryptographic system employs a Mach-Zehnder interferometer.

17. The method of claim 13, wherein the quantum cryptographic system employs a phase/polarization modulator.

18. The method of claim 13, wherein the quantum cryptographic system employs a freespace optical path.

19. The method of claim 13, wherein the quantum cryptographic system employs an optical fiber path.

20. The method of claim 13, wherein the quantum cryptographic system employs a link comprising photonic band-gap material.

21. The method of claim 1, further comprising sending a second reservation request for reserving a second rate from a second secret bits consuming application to the secret bits producing application, wherein the first reservation request and the second reservation request each include a priority of the respective request and the second reservation request has a different priority than the first reservation request.

22. The method of claim 1, further comprising using secret bits from the secret bits producing application by a second secret bits consuming application having no requested reserved rate.

23. The method of claim 1, wherein the reservation request includes a priority, a desired rate, and a minimum acceptable bit rate.

24. The method of claim 23, wherein the reserving the first rate comprises:
determining, by the secret bits producing application, whether the desired rate can be satisfied;
when the desired rate can be satisfied, sending a reply message to the requesting secret bits consuming application indicating a full-success;
when the desired rate cannot be satisfied, sending a reply message to the requesting secret bits consuming application indicating a partial-success when an amount of available of the rate is at least enough to satisfy the minimum acceptable rate; and
sending a reply message to the requesting secret bits consuming application indicating a failure to reserve the first rate when neither the desired rate nor the minimum acceptable rate can be satisfied.

25. The method of claim 1, further comprising canceling a reservation when the secret bits producing application receives a message from the secret bits consuming application indicating that a reservation of the first rate is no longer needed by the secret bits consuming application.

26. The method of claim 1, further comprising determining an estimated bit production rate by the secret bits producing application.

27. The method of claim 26, further comprising calculating an available rate of secret bits available for reservations, the calculating comprising:
calculating a total number of secret bits reserved for a secret bits consuming application; and
subtracting the total number of secret bits reserved for a secret bits consuming application from the estimated bit production rate to produce the available rate of secret bits available for reservations.

28. The method of claim 27, further comprising deleting at least one lowest priority reservation when the available rate of secret bits becomes negative, the deleting continuing until the available rate of secret bits becomes non-negative.

29. The method of claim 1, further comprising issuing a warning, by the secret bits producing application, when use of secret bits by the first secret bits consuming application from the secret bits producing application exceeds the first rate reserved for the first secret bits consuming application.

30. The method of claim 1, wherein the reserving act reserves the first rate for a limited period of time.

31. A system comprising:
a secret bits consuming application; and
a secret bits producing application configured to receive a request from the secret bits consuming application for a reservation of a rate of secret bits to be produced by the secret bits producing application, the secret bits producing application being further configured to determine whether the reservation can be satisfied and to send a notification to the secret bits consuming application when the reservation can be satisfied.

32. A machine-readable memory device having recorded thereon instructions for a processing system, such that when the instructions are read and executed by at least one processor, the at least one processor performs:
servicing a reservation request for reserving a rate at which secret bits are provided for a secret bits consuming application;
determining whether the reservation request can be successfully serviced; and
reserving the rate for the secret bits consuming application when the reservation request can be successfully serviced.

33. A computer-implemented system comprising:
means for producing secret bits for use in a cryptographic system;
means for using the secret bits to cryptographically protect traffic to be sent through a network, wherein the means for producing the secret bits includes:
means for receiving a reservation request from the means for using the bits, and means for reserving a rate at which the secret bits are provided and notifying the means for using of a successful reservation.

34. A method of reserving a rate of providing cryptographic key material, comprising:
specifying a desired consumption rate of cryptographic key material at a first network device;
reserving the desired consumption rate of cryptographic key material, and
outputting an indication that the desired consumption rate has been reserved.

35. A method of reserving a rate of providing secret bits by a secret bit producer that is based on advantage distillation, comprising:
specifying a desired rate by a first process;
reserving the desired rate by the secret bit producer that is based on advantage distillation; and
outputting an indication that the desired rate has been reserved.

36. A method of reserving a rate of providing generated cryptographic key material from an advantage distillation based secret bits producer; comprising:
generating, by the advantage distillation based secret bits producer, cryptographic key material;
receiving a request from a secure communication process for a reservation of the cryptographic key material at a first rate, the request identifying a minimum acceptable rate; and
notifying the secure communication process of a successful reservation when an available generated rate of cryptographic key material is greater than the minimum acceptable rate.

37. A method of reserving a rate of providing secret key material for protecting communications, the method comprising:
specifying a minimum desired consumption rate of secret key material and a priority by a client process;

determining, by a secret key material producing process, whether the minimum desired consumption rate of secret key material is available to the client process;

when the minimum desired consumption rate of secret key material is not available to the client process, making at least the minimum desired consumption rate of secret key material available by canceling at least one previously made reservation of a rate of the secret key material, each of the at least one previously made reservation having a lower priority than the specified priority;

reserving at least the minimum desired consumption rate of the secret key material for the client process; and outputting an indication that the at least the minimum desired consumption rate has been reserved.

* * * * *